US010872389B2

(12) United States Patent
Fitzgerald

(10) Patent No.: US 10,872,389 B2
(45) Date of Patent: Dec. 22, 2020

(54) TAXPAYER IDENTITY DETERMINATION THROUGH EXTERNAL VERFICATION

(71) Applicant: HRB Innovations, Inc., Las Vegas, NV (US)

(72) Inventor: William Fitzgerald, Overland Park, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 517 days.

(21) Appl. No.: 15/070,200

(22) Filed: Mar. 15, 2016

(65) Prior Publication Data

US 2017/0270629 A1    Sep. 21, 2017

(51) Int. Cl.
*G06Q 50/26* (2012.01)
*G06Q 40/00* (2012.01)

(52) U.S. Cl.
CPC ......... *G06Q 50/265* (2013.01); *G06Q 40/123* (2013.12)

(58) Field of Classification Search
CPC .................................................. G06Q 40/123
USPC ........................................................... 705/31
See application file for complete search history.

(56) References Cited

U.S. PATENT DOCUMENTS

| 9,990,678 | B1* | 6/2018 | Cabrera | G06Q 40/123 |
| 2013/0282539 | A1* | 10/2013 | Murray | G06Q 40/12 |
| | | | | 705/31 |
| 2016/0350870 | A1* | 12/2016 | Morin | G06Q 40/123 |

* cited by examiner

*Primary Examiner* — Robert R Niquette
*Assistant Examiner* — Liz P Nguyen
(74) *Attorney, Agent, or Firm* — Erise IP, P.A.

(57) ABSTRACT

A refinement verification engine authenticates a user submitting a subject tax return. The user is associated with an initial taxpayer identity confidence score in an intermediate range, such that the authenticity of the user is uncertain. The refinement verification engine is configured to perform the following steps: receiving tax information associated with the subject tax return for a subject taxpayer; acquiring an initial taxpayer identity confidence score that is indicative of a likelihood that the user is genuine; determining that the initial taxpayer identity confidence score falls into a predetermined range; identifying a verifiable data set within the taxpayer information; accessing an external data store containing information related to the verifiable data set; and determining whether information indicative of the verifiable data set is present in the external data store.

18 Claims, 6 Drawing Sheets

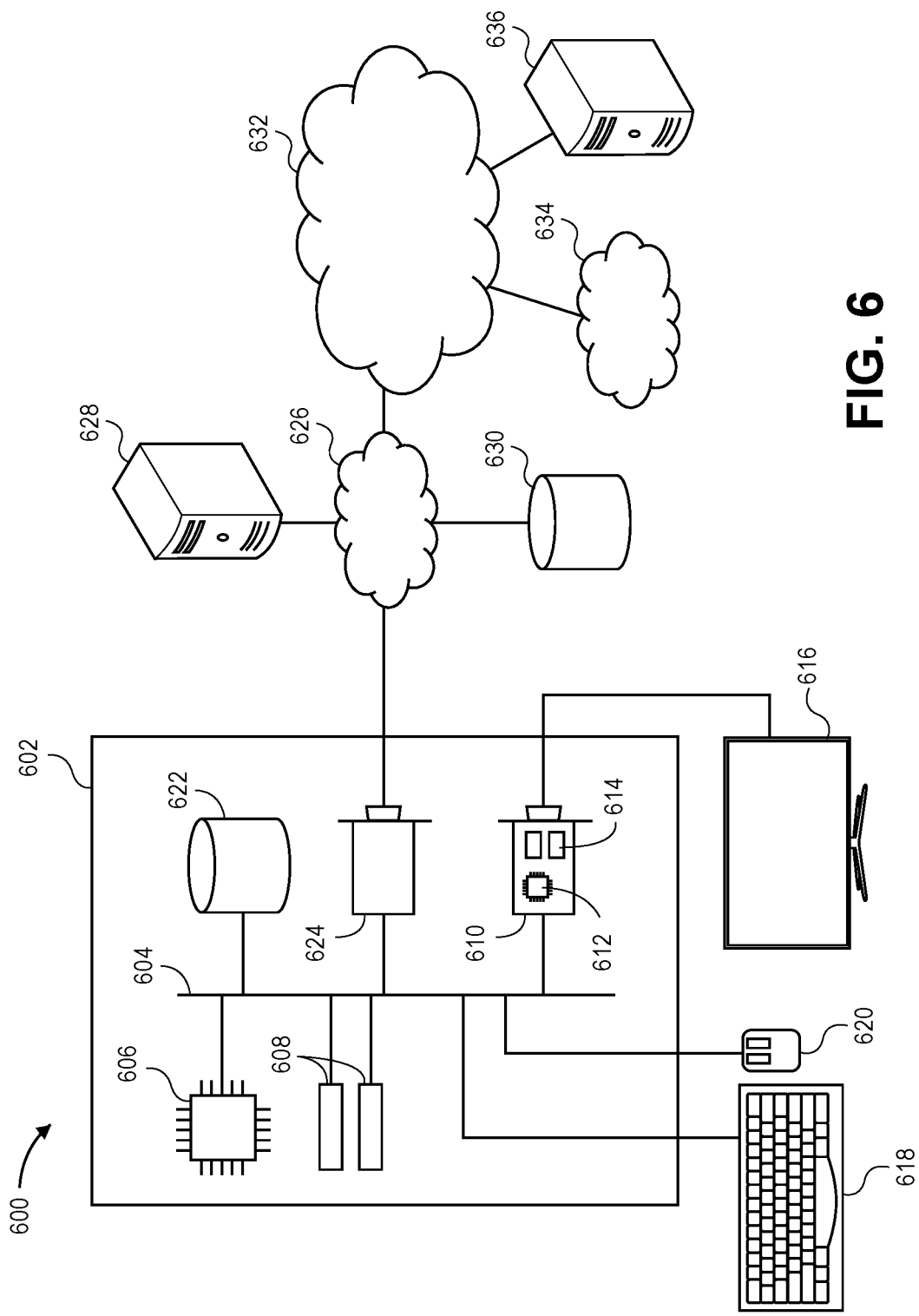

TAXPAYER IDENTITY DETERMINATION THROUGH EXTERNAL VERFICATION

RELATED APPLICATIONS

Embodiments and/or features of the invention described in the present document may be used with the subject matter disclosed in commonly assigned U.S. patent application Ser. No. 14/692,062, filed Apr. 21, 2015, and entitled "COMPUTER PROGRAM, METHOD, AND SYSTEM FOR DETECTING FRAUDULENTLY FILED TAX RETURNS." The above-mentioned patent application is hereby incorporated by reference in its entirety into the present application.

Embodiments and/or features of the invention described in the present document may be used with the subject matter disclosed in commonly assigned U.S. patent application Ser. No. 14/692,314, filed Apr. 21, 2015, and entitled "COMPUTER PROGRAM, METHOD, AND SYSTEM FOR DETECTING FRAUDULENTLY FILED TAX RETURNS." The above-mentioned patent application is hereby incorporated by reference in its entirety into the present application.

Embodiments and/or features of the invention described in the present document may be used with the subject matter disclosed in commonly assigned U.S. patent application Ser. No. 14/921,143, filed Oct. 23, 2015, and entitled "TAX FRAUD DETECTION THROUGH LINKED RELATIONSHIPS." The above-mentioned patent application is hereby incorporated by reference in its entirety into the present application.

Embodiments and/or features of the invention described in the present document may be used with the subject matter in commonly assigned and concurrently filed U.S. patent application Ser. No. 15/070,138, filed Mar. 15, 2016, and entitled "MACHINE LEARNING FOR FRAUD DETECTION." This application is hereby incorporated by reference in its entirety into the present application.

BACKGROUND

1. Field

Embodiments of the invention relate to fraud prevention in the field of electronically filed tax returns.

2. Related Art

Government taxing authorities, such as the U.S. Internal Revenue Service ("IRS"), require a taxpayer to file a tax return with the taxing authority for a specified tax period, such as a calendar year. The tax return sets forth tax information associated with the taxpayer, such as the taxpayer's name, address, social security number, wages, retirement investments, capital gains and losses, dependents, etc. The taxpayer commonly owes taxes to the government taxing authority. The taxpayer completes and submits a tax return that includes thereon an indication of the additional amount of tax owed or the refund to which the taxpayer is entitled. While the taxing authority will periodically audit and otherwise verify the information submitted on the tax return, the taxing authority largely relies on the honesty of the taxpayer in submitting a tax return that fairly and accurately reflects the amount of tax owed.

Because of the opportunity to receive a tax refund from the government taxing authority, a malfeasant may seek to file a fraudulent tax return. In recent years, tax fraud has become increasingly rampant. In 2014, the IRS reported that it caught $24.5 billion of fraudulent tax returns, and that it estimates to have paid an additional $5.5 billion in fraudulent tax returns. The increase in tax fraud can be linked to identity theft and data breaches, in which the taxpayer's personal information becomes compromised.

Techniques described in the related patent applications referenced above disclose fraud-detection systems that determine the likelihood a certain tax return and/or user is genuine. Tax returns with a high certainty will be filed (or allowed to be filed). Tax returns with a low certainty will be denied filing (or held, quarantined, etc.). Tax returns in an intermediate certainty may require manual review (such as by a tax professional) and or additional manual self-authentication from the user (such as by the performance of supplemental verification procedures). Both manual review and additional manual self-authentication have some disadvantages, such as being expensive and time consuming. Manual review requires a large staff to review the tax returns and identified confidence indicators. Manual self-authentication by the user is also time consuming and often leads to a negative experience for the user, due to the delay and extra steps required. Further, the verification often relies upon information to which the fraud-detection system and/or the tax professional cannot access. What is lacking in the prior art is a fraud detection system that minimizes the number of applications that require manual review and/or additional manual self-authentication.

SUMMARY

Embodiments of the invention solve the above-discussed problems by providing a verification engine for determining if the user and the tax return are genuine. The verification engine reduces the number of tax returns that fall within an intermediate range of certainty as to their authenticity by providing a secondary or follow on examination of the tax returns and associated users to more clearly determine whether the tax return is fraudulent or genuine. While some amount of manual review and/or additional manual self-authentication may still be necessary or desirable for borderline cases, the verification engine will significantly reduce the number of applications going through these time consuming and expensive processes. The verification engine may send certain data from the tax return and/or user information for external verification from a third party or an external repository of information. The verification engine may additionally or instead verify the data by accessing these external repositories directly. In either case, the received verification information is then utilized to refine the certainty as to whether the tax return is fraudulent or genuine. Based upon the verification, the tax return may thereafter be more accurately categorized without requiring excessive manual review or additional manual self-authentication.

A first embodiment of the invention is generally directed to a system for authenticating a user that is submitting a subject tax return. The system comprises an indicator acquisition engine, an indicator analysis engine, and a refinement verification engine. The indicator acquisition engine is configured for determining a plurality of confidence indicators regarding the user and a subject tax return, wherein each confidence indicator is indicative that the user is either genuine or fraudulent. The indicator analysis engine is configured for analyzing said plurality of confidence indicators so as to determine an initial taxpayer identity confidence score. The refinement verification engine is configured for automatically conducting a verification of the user and the subject tax return for an initial taxpayer identity confidence scores that fall into a predetermined range. The refinement verification engine is configured to perform the following steps: identifying a verifiable data set within the taxpayer information; accessing an external data store containing information related to the verifiable data set; and determining whether information indicative of the verifiable data set is present in the external data store.

A second embodiment of the invention is generally directed to a refinement verification engine for verifying the authenticity of a user submitting a subject tax return, wherein the user is associated with an initial taxpayer identity confidence score in an intermediate range, such that the authenticity of the user is uncertain. The refinement verification engine is configured to perform the following steps: receiving tax information associated with the subject tax return for a subject taxpayer; acquiring an initial taxpayer identity confidence score that is indicative of a likelihood that the user is genuine; determining that the initial taxpayer identity confidence score falls into a predetermined range; identifying a verifiable data set within the taxpayer information; accessing an external data store containing information related to the verifiable data set; and determining whether information indicative of the verifiable data set is present in the external data store.

A third embodiment of the invention is generally directed to a non-transitory computer-readable storage medium having a computer program stored thereon for authenticating that a user is genuine, wherein the non-transitory computer readable medium is associated with a third party verification service, wherein the computer program instructs at least one processing element to perform the following steps: receiving, from a refinement verification engine, a request for verification of a verifiable data set, wherein the verifiable data set is derived at least in part from a set of taxpayer information related to the user and a subject tax return, wherein the verifiable data set includes information capable of independent verification; analyzing the verifiable data set to determine a data store that comprises information potentially associated with the verifiable data set; accessing said data store to determine a set of findings based upon whether the verifiable data set substantially matches information within said data store; preparing a report indicative of the set of findings; and sending the report to the refinement verification engine.

Additional embodiments of the invention may be directed to a computerized method of performing the steps described herein, a tax preparation program, a tax fraud detection system, and the like.

BRIEF DESCRIPTION OF THE DRAWING FIGURES

Embodiments of the invention are described in detail below with reference to the attached drawing figures, wherein:

FIG. 6 is a system diagram illustrating the various hardware components of embodiments of the invention.

Figure 1:
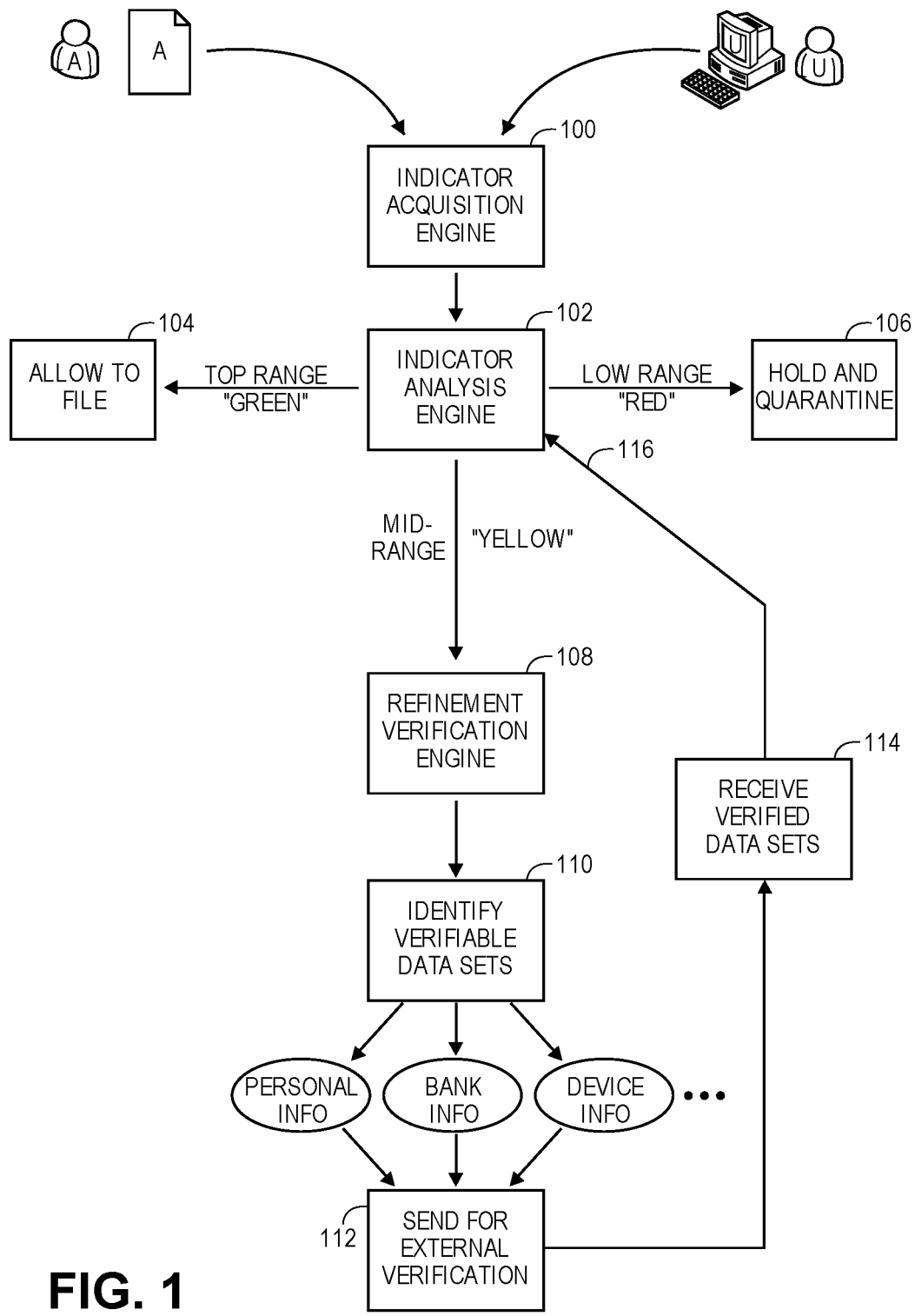
FIG. 1 is a flow diagram illustrating an exemplary embodiment of a system for detecting a fraudulent tax return.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein. It should also be noted that the subtitled sections within the Detailed Description are for the purpose of orienting the reader and should not be construed in a limiting sense.

System Overview

Embodiments of the invention comprise a computer program, a computerized method, and a system for detecting fraudulent tax returns via a refinement verification engine. Embodiments of the invention analyze tax returns as a component of or follow-on to a fraud detection system. The verification engine analyzes tax returns for which the genuineness (i.e., legitimate and not fraudulent) is uncertain. The genuineness may be uncertain because no analysis has yet been performed, or because a preliminary analysis did not definitely (or within a statistically reasonable tolerance) determine genuineness.

Embodiments of the invention verify the tax returns in a wide variety of techniques, as discussed in depth below. Each technique determines various confidence indicators that are indicative of a level of confidence that at least one tax return is either fraudulent or genuine. Confidence indicators are, generally speaking, measures of the probability or likelihood that the subject tax return is genuine or fraudulent based upon any or a few factors and analyses discussed in depth below. Confidence indicators may be "positive" in that they are indicative of genuineness or "negative" in that they are indicative of fraud.

Based upon the techniques and the determined confidence indicators, embodiments of the invention calculate or refine a taxpayer identity confidence score. The taxpayer identity confidence score is a summary of the likelihood that the subject tax return is either fraudulent or genuine. Based upon the taxpayer identity confidence score, the tax return may be submitted to the taxing authority, further authenticated, denied acceptance, denied transmission, quarantined, flagged for further investigation, etc.

FIG. 1 illustrates an exemplary flow diagram of an embodiment of the invention. Broadly, FIG. 1 illustrates how an initial taxpayer identity confidence score is generated and how the initial taxpayer identity confidence score is refined for those taxpayer identity confidence scores falling within a mid range. In Step 100, an indicator acquisition engine acquires confidence indicators about the authenticity of the user and the subject tax return. The indicator acquisition engine identifies information relevant to the user, the user devices, the subject taxpayer, etc. The steps performed by the indicator acquisition engine are discussed more in regards to FIG. 5 below.

In Step 102, an indicator analysis engine evaluates the identified confidence indicators to determine the initial taxpayer identity confidence score. While discussed more below, it should suffice for the present discussion that based upon the determined initial taxpayer identity confidence score, the system will determine what steps to take. The initial taxpayer identity confidence score may fall into any of various ranges. For example, the ranges may include a top range (referred to as "green") in which the system is relatively certain that the subject tax return is genuine, a low range (referred to as "red") in which the system is relatively certain that the subject tax return is fraudulent, and a mid range (referred to as "yellow") in which the system is uncertain as to whether the subject tax return is fraudulent or genuine. Of course, other nomenclature for the various ranges may be used, including defined ranges or percentages, a graded score, or the like.

In Step 104, if the subject tax return is determined to have a taxpayer identity confidence score in the top "green" range, the system files the subject tax return, allows the subject tax return to be filed, directs the subject tax return to be filed, or otherwise associates the taxpayer identity confidence score with the subject tax return such that it can be filed independently.

In Step 106, if the subject tax return is determined to have a taxpayer identity confidence score in the low "red" range, the system prevents the subject tax return from being filed. This can include holding the subject tax return, quarantining the subject tax return, reporting the subject tax return to an enforcement agency, etc.

In Step 108, if the subject tax return is determined to have a taxpayer identity confidence score in the mid "yellow" range, the system sends the subject tax return to the refinement verification engine for further analysis. It should be appreciated, as discussed above, that in the prior art such subject tax returns would be sent for manual review by a tax professional and/or additional manual self-authentication by the user. In embodiments of the invention, the subject tax return is instead sent for additional automated steps to attempt to move the subject tax return out of the mid "yellow" range into either the top "green" range or the low "red" range and without requiring (or only requiring minimal) human interaction or analysis. If the refinement verification engine can succeed in identifying additional confidence indicators, as discussed below, the administrative burden and the burden on the user can be decreased.

In Step 110, the refinement verification engine identifies at least one verifiable data set. A verifiable data set is a subset of the tax information and/or user information gathered above that is capable of independent verification. For example, it is possible to verify that a certain subject taxpayer actually lives at the address claimed on the subject tax return. As another example, it is also possible to verify that the name on the bank account to which the tax return is to be sent is the same as the subject taxpayer's name. As yet another example, it is possible to verify that an IP address from which the user is accessing the system is in fact associated with the subject taxpayer. The refinement verification engine therefore identifies these verifiable data sets, such as the personal information, the bank information, and the device information that would be capable of being verified.

In Step 112, these verifiable data sets are sent for verification. This step, as others, can be performed in many ways. In some embodiments, the verifiable sets are sent to an independent third party. This third party can then verify that the verifiable data set is genuine in any of numerous ways, as discussed below. In other embodiments, the refinement verification engine accesses data stores or other repositories controlled by the third party so as to directly authenticate that the verifiable data sets are genuine.

In Step 114, the refinement verification engine receives or otherwise acquires the results of the authentication. For example, the results may include a message stating that the information contained in the verifiable data set appears in the third party's repository and is associated in the same way. As another example, the results may include a score or other grade that is indicative of how much and to what extent the verifiable data set was authenticated.

In Step 116, this information is sent to the indicator analysis engine. The indicator analysis engine then considers the results as confidence indicators and compares the results to the other confidence indicators that were previously evaluated. Based upon this analysis, the indicator analysis engine calculates a refined taxpayer identity confidence score. If the refined taxpayer identity confidence score is in the top "green" range, the subject tax return is allowed to be filed as discussed above in Step 104. If the refined taxpayer identity confidence score is in the low "red" range, the subject tax return is held as described above in Step 106. If the refined taxpayer identity confidence score is again in the mid "yellow" range, the subject tax return may be sent again to the refinement verification engine, held as though it were in the low "red" range, marked for manual review and/or additional manual self-authentication, or otherwise reevaluated.

Before discussing these steps in more detail, terms used herein will be discussed for clarity. The following discussion provides examples and broad, non-limiting discussions of the terms herein.

A "taxpayer" includes any entity, either a legal or natural person, that files a tax return with a government taxing authority. The taxpayer may also be a first spouse and a second spouse filing a joint return. Taxes to be paid can be United States Federal Income Tax, income tax for the various states within the United States, corporate taxes, partnership taxes, LLC taxes, property taxes, tariffs, or other taxes. Typically, the taxpayer provides information relevant to themselves and the amount of tax owed in the form of the tax return. The tax return is discussed more below. It should also be noted that in embodiments of the invention, the taxpayer is instead a beneficiary of a government entitlement program, as discussed below.

The "subject taxpayer," as used herein, refers to the taxpayer for which the tax return purports to apply. The subject taxpayer is the taxpayer whose name or names and other information appear on the tax return. In most instances, all or most of the subject taxpayer information will relate to a single discernable subject taxpayer (or two discernable natural persons that are spouses of each other). For example, in some instances, a malfeasant will copy subject taxpayer information from a filed tax return, change the bank deposit account information, and submit a new fraudulent tax return. In this example, the subject taxpayer is the taxpayer whose information appears on the filed tax return (whose information was copied from a previously filed tax return). In some instances, the subject taxpayer information is an amalgamation of more than one taxpayer's information. For example, the subject taxpayer information may include a fake name, a stolen Social Security Number, a fake address, and deposit account information for the malfeasant. In some instances, the subject taxpayer information is mostly indicative of a single discernable entity. For example, the subject taxpayer information may include all true information for the subject taxpayer, but also include a physical address or post office box address associated with the malfeasant in an attempt to have the tax return check delivered to that location. In this example, the subject taxpayer is the single discernable entity to which the majority of the information applies.

Embodiments of the invention are generally directed to the detection and identification of malfeasants in the submission of fraudulent tax returns. Malfeasants operate in a number of methods to attempt to receive an illegal tax return. A few of those methods have been and will be briefly discussed for the sake of clarity. However, it should be appreciated that embodiments of the invention are directed to the detection and identification of other methods and types of malfeasants. It should be appreciated that in some instances, the subject taxpayer is a malfeasant. In these instances, the malfeasant may also be the user of the system or the customer of the tax professional. For example, the subject taxpayer may be a malfeasant who deliberately underreports income or claims deductions for which they do not qualify. Many fraudulent tax returns fall into one of two categories: those in which a malfeasant files a tax return comprising at least some personal identification information that belongs to another, and those in which a malfeasant files a tax return comprising a substantially duplicate tax return of a subject taxpayer with altered deposit account information. In both of these categories, the malfeasant is performing illegal acts in an attempt to receive a tax refund amount to which they are not entitled. Embodiments of the invention, as discussed below, may detect fraudulent returns in either, both, or other categories.

The "user" is the person who is utilizing or interacting with the system. The user acts, or purports to act, on behalf of the subject taxpayer. Examples of users include the subject taxpayer, an authorized friend or family member of the subject taxpayer, a tax professional, a financial professional, or a malfeasant. In some embodiments, the user is connected to the system while the discussed steps are performed. In other embodiments, the user is no longer connected to the system while the discussed steps are performed. A user is "genuine" when they either are the subject taxpayer or are someone duly authorized to act on the taxpayer's behalf. A user is "fraudulent" when the user is not authorized by the subject taxpayer and/or preparing and submitting a fraudulent tax return. An "operator" is a person associated with the system, such as an administrator, tax professional, or the like.

The "taxpayer identity confidence score" is an indication of a likelihood that the subject tax return is either genuine or fraudulent. The taxpayer identity confidence score is therefore a snapshot or summary of the analyses and calculations performed by the system in determining whether the subject tax return is fraudulent. The tax professional and/or the taxing authority, in considering whether to file or accept the subject tax return, may consider the taxpayer identity confidence score. For example, a taxing authority may dictate by rule or regulation a minimum acceptable taxpayer identity confidence score for the acceptance of tax returns. In some instances the minimum acceptable taxpayer identity confidence score may be based upon the type of tax return, the type of taxpayer, the time of year, etc. For example, over the course of a tax return filing season (i.e., typically mid-January through April 15th following the current tax year) fraud is more rampant earlier in the tax return filing season. This is because malfeasants are more likely to be detected if the subject taxpayer has already filed their tax return for the tax year. The taxing authority may therefore require a higher minimum acceptable taxpayer identity confidence score early in the tax return filing season.

The taxpayer identity confidence score can be expressed in any of several forms. For the sake of simplicity, the present disclosure uses an exemplary form of a color system. In the exemplary color system, red is definitely fraudulent, green is definitely genuine, and yellow is uncertain of genuine or fraudulent.

Utilizing Embodiments of the Invention

Embodiments of the invention can be utilized by any of several types of entities. Embodiments of the invention may be used by a tax professional, a taxpayer using a self-preparation tax return product, a financial professional, a government taxing authority prior to processing of the tax return, or a third party acting on behalf of either or both of the tax professional or the taxpayer. As utilized by the various entities, the invention may serve various purposes. First, embodiments of the invention may be a background operation that monitors the input of information as the user is entering it. Second, embodiments of the invention may be a gatekeeper that analyzes the completed tax return before allowing the tax return to be submitted to the taxing authority. Third, embodiments of the invention may be a triage function that examines tax returns that are designated as potentially fraudulent by an outside person or function. For example, an agent of the taxing authority notes potential indications of fraud in a tax return under review and submits the return for further analysis by the system. Fourth, embodiments of the invention may be a surveyor function that tests certain tax returns at random or designated intervals.

In embodiments of the invention, a self-preparation tax return product utilizes the invention. For example, if the taxpayer uses a self-preparation tax return product, such as tax preparation software, embodiments of the invention provide a service to the taxpayer in conjunction with using the tax preparation software. The service may be provided to the user as a value-added benefit to the tax preparation software or as a pay service. Alternatively, if embodiments of the invention are used by the tax professional, the tax professional may use the service in conjunction with preparation and filing of the tax return. Upon completion and analysis of the subject tax return, the tax preparation program may submit the subject tax return for filing along with information indicative of the taxpayer identity confidence score. For a high score, this information reassures the taxing authority that the subject tax return is genuine.

In embodiments of the invention, the invention is utilized by a tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing at least a portion of the set of taxpayer information. It should also be noted that in rare instances, the tax professional may be a malfeasant. For example, if a tax professional improperly claims additional deductions and credits for which the subject taxpayer does not qualify or steals the identity of their client to prepare future fraudulent tax returns based upon this identity, the tax professional may be considered a malfeasant.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional does not actually prepare, or assist in preparing, the tax return. Instead, the financial professional has access to a completed and/or filed tax return that was prepared by the taxpayer or the tax professional. Embodiments utilized by the financial professional may be a free or pay service provided by the financial professional to clients to help bolster the legitimacy of the clients' tax returns. The financial professional may do so because the financial professional has access to additional authentication information for the taxpayer, in excess of the authentication information available to the tax professional.

In embodiments of the invention, the tax professional and financial professional are the same entity, or are employees of the same entity, or are otherwise associated with each other through, for example, a contractual or business relationship. In some embodiments, there is no financial professional involved. In other embodiments, there is no tax professional involved, such as in an instance where the taxpayer prepares their own tax return. As such, the term "tax professional" or "financial professional" is used throughout to denote either or both the tax professional and financial professional. The financial professional may also act on behalf of either the taxpayer or the tax professional in the discussed steps.

In still other embodiments of the invention, the invention is utilized by a taxing authority. The taxing authority (also known as a revenue service or revenue agency) is a government entity or an entity associated with a government body. The taxing authority has, through prescribed legal authority, the power to assess, levy, and collect taxes. The taxing authority may also have the power to collect other non-tax-related revenue, such as penalties and interest. The taxing authority may perform secondary functions, such as investigating and charging tax fraud, performing audits, etc. The taxing authority can be at any level of government: international, federal, state, county, and city. Examples of taxing authorities include the IRS, the Missouri Department of Revenue, etc. The taxing authority may be motivated to utilize the invention to provide a safe method of electronic filing for the taxpayers, thereby encouraging electronic filing which is easier and cheaper to receive than paper tax returns. Further, the invention may be useful to a taxing authority to take a survey of incoming tax returns to determine how common fraudulent returns are. As an example, if the invention notes an increase in potentially fraudulent returns being received, the taxing authority may raise the minimum acceptable taxpayer identity confidence score for future tax returns.

In one embodiment, the taxpayer enters information from his tax-related documents, such as W2s and 1099s, into the self-preparation tax return program. In another embodiment, the taxpayer provides the tax-related documents to the tax professional, who enters the information into a professional-preparation tax return program. The self-preparation tax return program and the professional-preparation tax return program may be the same as or interface with the computer program of embodiments of the invention. The tax return program generates a tax return.

The tax return is essentially a report filed with the appropriate government taxing authority, such as the IRS in the case of U.S. federal income tax. Typically, the tax return contains information used to calculate the tax due. Typically, the tax return is either printed or hand-written on a form generated by the taxing authority, such as the Form 1020. However, the tax return could be on another type of form, a financial document, or other document. On the tax return, the taxpayer or tax professional calculates the taxes due. To assist in the calculation and to allow the taxing authority to verify the calculations, the tax return contains pertinent information associated with the taxpayer for the tax period. The tax return can be either written, digital, or a combination of both. In other embodiments, information relevant to the taxpayer and the tax to be paid are provided on other various forms and documents.

The "subject tax return," as used herein, refers to the tax return that is being subjected to the authentication by the invention. The subject tax return purports to relate to the taxes paid and owed by the subject taxpayer. The subject tax return includes information for the subject taxpayer, including identification information, contact information, and other tax information. As discussed above, the subject tax return may be designated for authentication as a free service or as an additional service by the tax professional, financial professional, and/or taxing authority. The subject tax return may refer to a set of information indicative of a tax return in lieu of a completed tax return itself. In embodiments of the invention, the system extracts key tax information from the subject tax return that aids in the detection of fraud. For example, the system may extract taxpayer identification information, deposit account information, employer information, etc., while not extracting the dollar amounts involved in the calculation of the tax due. In other embodiments, the complete and entire subject tax return is imported to the system for analysis, after which the system only analyzes the pertinent information.

Tax information associated with any tax return includes one or more of the following: name of taxpayer; name of taxpayer's spouse, if any; address; social security number; bank account information; wages; retirement investments; insurance distributions; income tax withholdings for the tax period; capital gains and losses; dependents, including number of dependents, names, and identifying information; tax deductible expenses, such as charitable contributions; and like information. The tax information may also be received from various sources, including a prior-year tax return filed by the taxpayer; entry of tax information by the taxpayer into a data store, such as via tax preparation software; and entry of tax information by a tax professional. For example, if the taxpayer uses self-preparation tax software, embodiments of the invention may generate or otherwise populate the database using tax information entered by the taxpayer via the self-preparation tax software. In alternative embodiments, the tax information may not necessarily be tax information associated with a tax return for the taxpayer but instead may be information associated with the taxpayer. For example, tax information may include a credit score (or credit score range) of the taxpayer or a name of credit accounts held by the taxpayer.

Tax returns are typically due in a tax return filing season following the tax year. A tax year is typically a calendar or fiscal year upon which the tax is calculated. A tax period may be another length of upon which the tax is calculated, such as a month, a quarter, half of a year, two years, five years, etc. It should be appreciated that the "current tax year" and "current tax period" as used herein, refers to the tax year or tax period for which the subject tax return relates. For example, a tax return submitted in March 2016 typically relates to the 2015 tax year. This is because the taxes accrue ending December 31 of the tax year and the tax return is submitted at some point in the following calendar year as prescribed by law (e.g., by April 15$^{th}$). "Previous tax returns" can include previously filed tax returns for the current tax year and/or current tax period. To follow the above example, for a tax return submitted in March 2015, previous tax returns include tax returns submitted in January 2015 through March 2015 (up to immediately preceding the submission of said tax return). "Previous tax year" and "previous tax period," as used herein, refer to those tax years and tax periods for which tax returns are no longer being typically submitted. To follow the above example, for a tax return submitted in March 2015, previous tax years would include the 2013 tax year, the 2012 tax year, etc.

Utilizing the Taxpayer Identity Confidence Score

Figure 2:
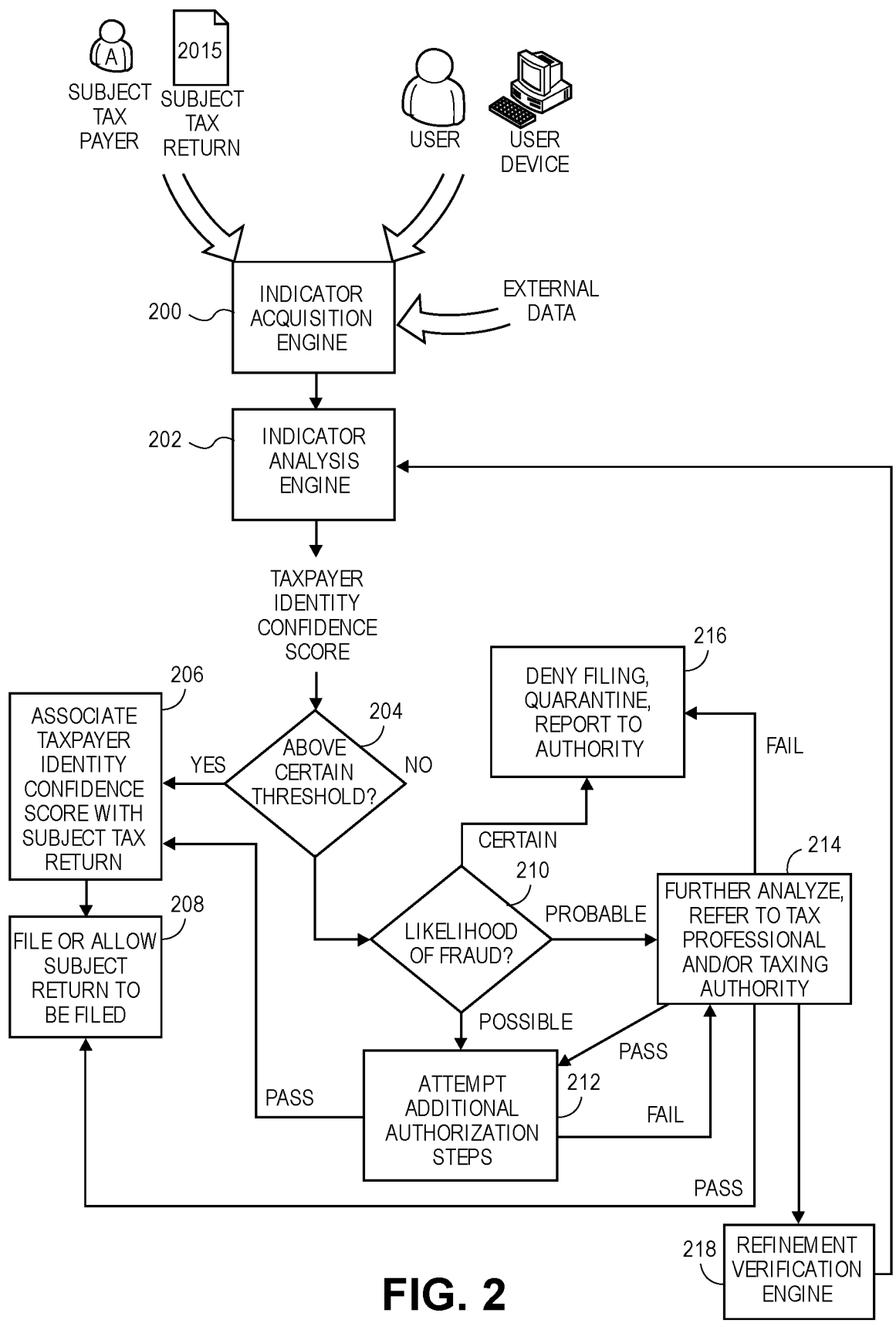
FIG. 2 is a flow diagram illustrating another exemplary embodiment of a system for detecting a fraudulent tax return.

FIG. 2 is generally directed to the utilization of the taxpayer identity confidence score once it is calculated. FIG. 2 gives more detailed information as to how the subject tax return is selected for being sent to the refinement verification engine. FIG. 2 also illustrates another embodiment of the invention that illustrates a more detailed threshold system than is discussed in FIG. 1. Because the refinement verification engine can rely on third party systems and/or third party repositories, in embodiments of the invention only certain subject tax returns will be selected for analysis by the refinement verification engine. This is because the refinement verification engine may incur costs and computational burdens on the system that are unnecessary for many or most tax returns.

In Step 200 the indicator acquisition engine detects confidence indicators related to the subject tax return and/or the user. In Step 202 the indicator analysis engine calculates the initial taxpayer identity confidence score. This is similar to Steps 100 and 102 discussed above, as well as the steps of FIG. 5 discussed in more depth below.

In Step 204, the system determines whether the taxpayer identity confidence score is above a certain high threshold. This high threshold is, in essence, a "proven to be genuine" threshold in which the system is sufficiently confident that the subject tax return is genuine so as to allow the taxpayer to file the tax return with no further analysis or authentication. In some embodiments, the user is invited to attempt to increase their taxpayer identity confidence score, such as discussed below, even though their taxpayer identity confidence score is already above the high threshold. The user may be incentivized to further authenticate to insulate the subject tax return from future scrutiny (such as when a later-filed tax return bears a duplicate SSN), to provide the taxing authority with additional confidence in the genuineness of the subject tax return, or to otherwise confirm the veracity of the tax return or included information.

If the taxpayer identity confidence score is above the high threshold, in Step 206 the system associates the taxpayer identity confidence score with the subject tax return. In some embodiments, the system places the taxpayer identity confidence score onto the subject tax return or otherwise associates the score with the subject tax return. For example, the subject tax return may have a field for the taxpayer identity confidence score or the taxpayer identity confidence score may be disposed on the top or margin area of the subject tax return. In other embodiments, the taxpayer identity confidence score is included in an electronic communication to the taxing authority that accompanies, precedes, or follows the submission of the subject tax return to the taxing authority. In another embodiment, the score is only associated with the tax return if the score satisfies the high threshold.

In some embodiments, the taxpayer identity confidence score is associated with metadata of the subject tax return. Metadata associates one set of data with another set of data. The metadata may be embedded in the subject tax return, stored externally in a separate file that is associated with the subject tax return, otherwise associated with the subject tax return, or all of the above. Embedding the taxpayer identity confidence score into the same file with the subject tax return can be advantageous because it allows the metadata to travel as part of the data it describes. In some such embodiments, metadata is associated with a section or field of the subject tax return. This is advantageous where, for example, the same subject tax return contains more than one taxpayer identity confidence score (e.g., a joint taxpayer), or where there are confidence scores associated with various sections or attached documents to the subject tax return. In other such embodiments, the metadata is associated with the subject tax return file as a whole. Externally stored metadata may also have advantages, such as ease of searching and indexing. The metadata may also be stored in a human-readable format, such that an operator can access and understand the metadata without any special software. The metadata may also be encrypted and locked such that a malfeasant cannot change the taxpayer identity confidence score associated with the subject tax return before submitting the subject tax return to the taxing authority.

In Step 208, the system files, allows another program or process to file, or accepts the subject tax return. In systems that perform a gatekeeping function (as discussed above), the system in essence opens the gate to allow the user to file the subject tax return. In systems that perform a triage function (as discussed above), the system in essence exonerates the subject tax return. In systems that perform a surveyor function (as discussed above), the system in essence records the findings and moves on to another tax return.

If the taxpayer identity confidence score is below the high threshold discussed above in Step 204, the system further analyzes a likelihood of fraud in Step 210. In determining this, the system may utilize additional thresholds. For example, a taxpayer identity confidence score below a certain low threshold is "certain" to be fraudulent, between the low threshold and an intermediate threshold is "possible" to be fraudulent, and above the intermediate threshold but below the high threshold is "probable" to be fraudulent. Other predetermined ranges may also be used, such as below a single threshold is "possible" to be fraudulent.

If the system determines that the likelihood of fraud is only possible (i.e., the taxpayer identity confidence score is between the intermediate threshold and the high threshold), in Step 212 the system may allow the user to attempt additional authentication steps to verify their genuineness. While discussed more below, these additional authentication steps could include the entry of additional authentication information, biometric or facial recognition software, the entry of credentials to other verifiable computer systems, the answering of "out of wallet" questions, response to certain known contact information for the subject taxpayer, or other forms of authenticating a user. If the user passes the additional authentication steps so as to raise the taxpayer identity confidence score above the high threshold, the system then proceeds to Step 206 (discussed above) and associates the new taxpayer identity confidence score with the subject tax return. If the user fails the additional authentication steps, the taxpayer identity confidence score may be correspondingly lowered.

If the system determines the likelihood of fraud to be probable (i.e., the taxpayer identity confidence score is below the intermediate threshold but above the low threshold), in Step 214 the system performs further analysis and/or refers the subject tax return for further analysis, such as by the refinement verification engine (discussed below). In embodiments, the further analysis may include requesting additional information from the user to verify the user's identity.

In some embodiments, such as if Step 214 is arrived at after being run through the refinement verification engine, this further analysis may be performed by an operator (i.e., a human that is an agent of or associated with the system). The operator may be alerted to the probable fraud status and assigned to investigate. The operator may then attempt secondary authentication methods to verify the user (e.g., calling a phone number of the subject taxpayer in an attempt to speak with the subject taxpayer to verify that the subject taxpayer is or has authorized the user). The operator may also review the collected information to determine a course of action (e.g., perform further investigations into certain criteria, instruct the system to continue to monitor the user, etc.). The operator may also request that the user physically travel to a location associated with system or the tax professional, such as an office location of the tax professional, for in-person verification. If the user authenticates successfully, the system may proceed to Step 206 above. If the user fails to authenticate, the system may downgrade the taxpayer identity confidence score to "certain" fraud. It should be appreciated that the human operator is a time consuming and expensive option, and as such the refinement verification engine is utilized to prevent this.

If the system determines the likelihood of fraud to be certain (i.e., the taxpayer identity confidence score is below the low threshold), in Step 214 the system acts to prevent the fraud. Steps involved in preventing fraud could include denying filing, rejecting the filed return, quarantining the subject tax return such that the user can no longer alter or delete it, reporting the fraud to the taxing authority, reporting the fraud to the tax professional, reporting the fraud to the subject taxpayer via known contact information, or other prevention of filing of the tax return.

In Step 216, the system, or an operator of the system, notifies an appropriate law enforcement agency and/or the taxing authority about the potential or probable fraud. In many instances, timely notification makes it is easier to discover and prosecute the malfeasant. For example, a malfeasant may submit the subject tax return to the system. The system detects the fraud and notifies a fraud prevention department of the taxing authority. Because the malfeasant is still connected to the system, waiting for the subject tax return to be filed, the fraud prevention department may be able to track the malfeasant's location based upon information obtained from the computer through which the malfeasant is connected to the Internet. By acting quickly, the system enables the arrest and prosecution of more malfeasants. Fraud therefore becomes less likely due to the increased likelihood of failure and prosecution.

In Step 218, the system sends the information to the refinement verification engine, as discussed below, to further verify and validate the user before utilizing a human operator (as discussed above in Step 214).

Refining the Taxpayer Identity Confidence Score

Figure 3:
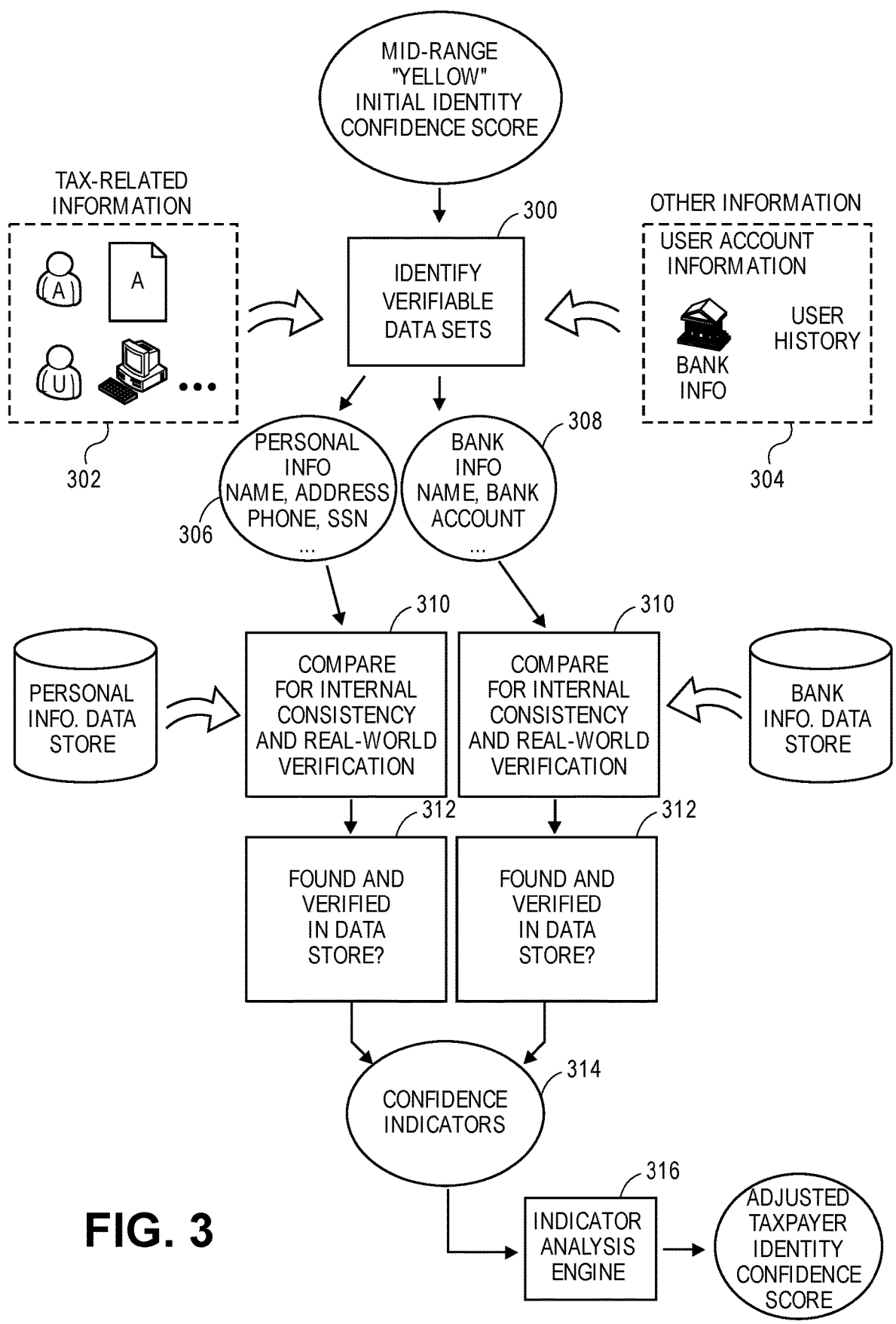
FIG. 3 is a flow diagram illustrating an exemplary embodiment of a refinement verification engine.

FIG. 3 depicts an exemplary method in which the initial taxpayer identity confidence score falling into a predetermined (e.g., intermediate) range is further analyzed and investigated into a refined taxpayer identity confidence score. It should be appreciated that in some embodiments of the invention, these steps may be performed for all tax returns, most tax returns, tax returns falling into either the low ranges or the mid ranges as a double check mechanism, tax returns in which the user agrees to pay an additional fee for enhanced security, tax returns corresponding to new users to the system (e.g., without prior use of the system), tax returns filed before or after a certain date (as the date of filing may be indicative of fraud), tax returns filed from a geographic location other than the vicinity in which the subject taxpayer lives, or other at-risk tax returns. For example, even if the subject tax return has a taxpayer identity confidence score above the high threshold but nonetheless is being filed from a geographic location away from the home area of the subject taxpayer, it may be prudent to send the subject tax return through the refinement verification engine to ensure that the subject tax return is in fact genuine.

Further, because in some embodiments the decision to send the subject tax return through the refinement verification engine is independent of the taxpayer identity confidence score, in embodiments of the invention the steps described herein are performed concurrently with or independently of the calculation of the taxpayer identity confidence score. FIG. 3 depicting that the initial taxpayer identity confidence score is entered into the refinement verification engine and exists prior to the beginning of the steps described therein is therefore only an exemplary embodiment of the invention. This embodiment is discussed and illustrated for clarity, but should not be considered as limiting on the invention.

In Step 300, the refinement verification engine receives or acquires an indication that a certain subject tax return is subject to further analysis. This may be because the taxpayer identity confidence score has fallen into a mid "yellow" range, as illustrated, or based upon other factors, such as discussed above. The refinement verification engine therefore begins the process of identifying verifiable data sets that can be independently and/or externally verified as being accurate and authentic for the subject tax return.

In Step 302, the refinement verification engine accesses the tax-related information and the user information that was (or is) being used to calculate the taxpayer identity confidence score. This can include the various types of information as discussed below in FIG. 5, such as information about the subject taxpayer, information about the subject tax return, information about the user of the system, information about the user device that is accessing the system, etc. In Step 304, additional information may be accessed. This can include account information for the user, bank information, user history, and the like. The combination of Steps 302 and 304 therefore provide the maximum amount of information from which the verifiable data sets can be identified.

In Step 306 and Step 308, the refinement authentication engine identifies specific verifiable data sets. A verifiable data set is a collection of information about the subject tax return, the user, the subject taxpayer, etc. The verifiable data set is typically a subset of all of the data gathered in Steps 302 and 304. The verifiable data set is capable of independent and/or external verification that the information therein is reflected in the real world and is in fact true for the subject taxpayer and/or user. For example, in Step 306 the identified verifiable data set is personal data for the subject taxpayer. This information in the verifiable data set may include the name, address, phone number, and Social Security Number (SSN) for the subject taxpayer. The verifiable data set is therefore used to determine whether this person (the subject taxpayer) actually exists and actually has the characteristics claimed. As another example, in Step 308 the identified verifiable data set includes bank information (or other refund vehicle) for the bank account that is identified in the subject tax return (or other related documents) as the recipient of the tax return. The verifiable data set is therefore used to determine whether this bank account exists and whether the subject taxpayer is in fact listed on the bank account.

In some embodiments of the invention, the set of verifiable data is configured to be verified that the user is in fact that the taxpayer. For example, the verifiable data set may include personal information for the user. A third party verification service may then receive biometric information either directly from the user or in the set of verification data. The third party verification service may then compare the biometric data with the personal data to determine whether the user is in fact the taxpayer (or someone associated with the taxpayer account). This could include comparing the biometric data supplied against a set of control biometric data for that person that was previously stored or known by the third party verification service.

In Step 310, the verifiable data sets are compared to external data stores to determine whether they are internally consistent and verified in the real world. Internal consistency, as used herein, refers to various information in the verifiable data set being related to one another as reflected in the verifiable data set. Verification in the real world, as used herein, refers to the various information in the verifiable data set being found in the external data store. For example, if the taxpayer name and the SSN are both found in the external data store, but not correlated with one another, this would not be internally consistent.

In embodiments of the invention, the external data store may be dependent on the type of information in the verifiable data set. For example, the external data store may include a repository of banking information for banks throughout the country, for a specific group of banks, for a specific bank, or other bank-specific information. In some embodiments of the invention, the external data store is within Step 310. It should thus be appreciated that embodiments of the invention will identify which, if any, external data store will be accessed. For example, based upon the bank information provided by the user, the system may know the specific external data store that contains information for that bank.

In Step 312, it is determined whether the verified data set was found and verified in the external data store. In various embodiments of the invention, Step 312 is performed by an administrator of the external data store, a third party verification service, an independent government or administrative body, or the system itself. It should also be appreciated that based upon the verifiable data sets identified in Step 300 above, Step 312 may be performed by numerous different parties. For example, the system may directly access a publicly available external data store to verify the personal information verifiable data set, and the system may pay a third party verification service to verify the banking information verifiable data set. It should also be appreciated that because embodiments of the invention require the system to access and in some instances pay for these external data stores, these steps may only be performed for certain tax returns found to be in the mid "yellow" range.

In Step 314, the verification information received, acquired, or generated is analyzed as confidence indicators. This may be performed by the system, by the indicator acquisition engine as discussed in FIG. 5 below, or the like. In some embodiments, certain verification information may immediately determine the subject tax return to be either fraudulent or genuine. For example, the biometric data as discussed above may definitively determine that the user is genuine. In other embodiments, such as in Step 316, these confidence indicators are sent to the indicator analysis engine for further analysis. The indicator analysis engine may compare the new confidence indicators against previously or separately determined confidence indicators. As such, the indicator analysis engine then generates an adjusted taxpayer identity confidence score.

Figure 4:
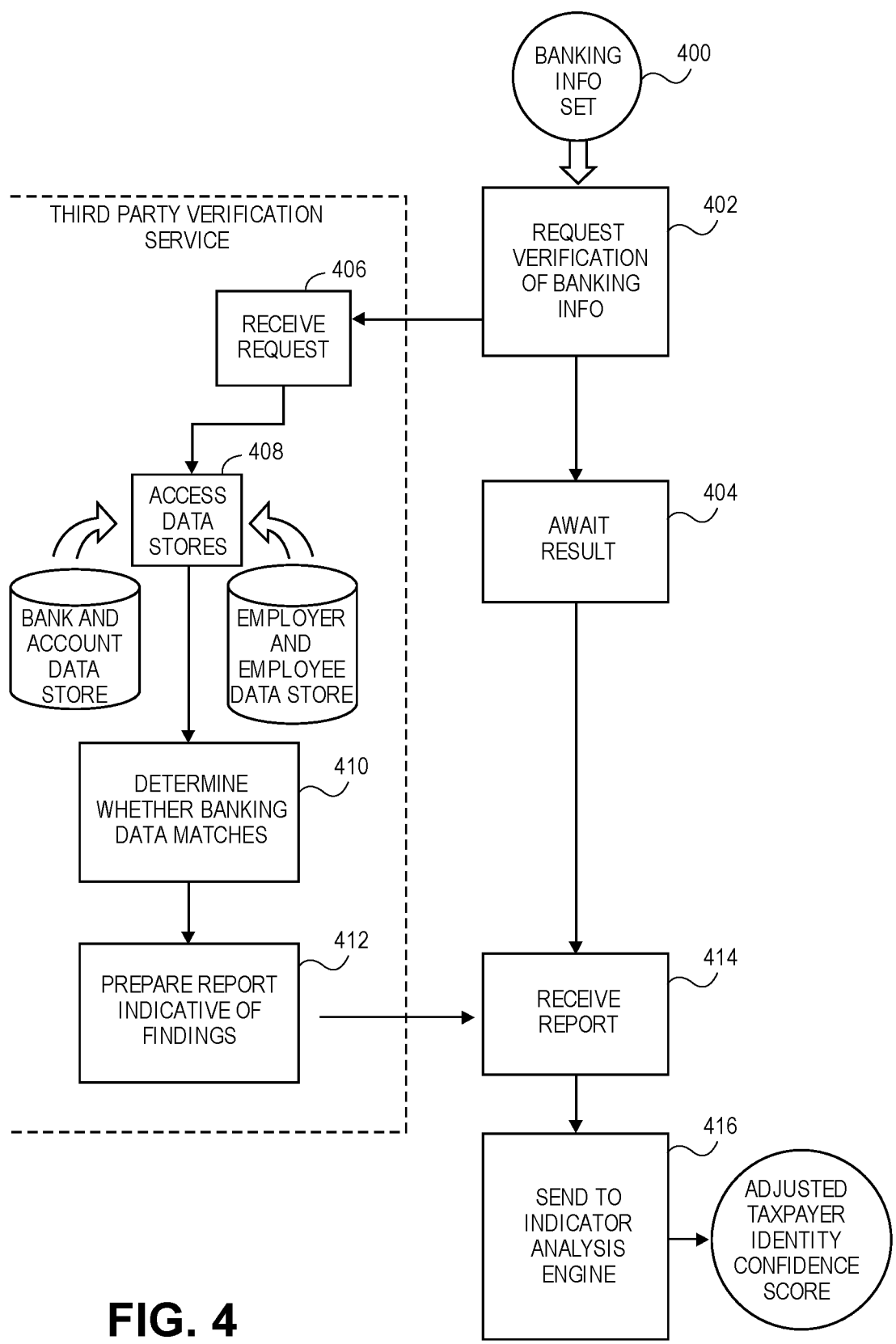
FIG. 4 is a flow diagram illustrating another exemplary embodiment of a refinement verification engine accessing an external verification service.

FIG. 4 depicts an exemplary method in which one of the identified verifiable data sets is further analyzed so as to identify confidence indicators. FIG. 4 discusses the analysis of a verifiable data set with banking information. It should be appreciated that this is an exemplary analysis and that a similar analysis would be performed for other types of verifiable data sets. Further, FIG. 4 depicts an embodiment of the invention in which several of the steps are performed by a third party verification service. It should be appreciated that this too is an exemplary way in which the discussed steps could be performed.

In Step 400, the banking information set is identified, received, extracted, or otherwise acquired. In Step 402, the system requests verification of the banking information set. The request may be in the form of an electronic message to the third party verification service, an uploading of the banking information set to a certain database, or other similar method of requesting information. The request may include payment information for the services provided, a customer number, an account number, or the like. In Step 404, the system then awaits the result of the verification of the verifiable data set. This may include performing other functions, verifying other verifiable data sets, performing the other discussed functions, etc.

Steps 406 to 412 are performed by a third party verification service. The third party verification service may include any of numerous types of services. For example, the third party verification service could be a digital identity network such as THREATMETRIX, IDOLOGY, and DATAX; a credit bureau, such as EXPERIAN, EQUIFAX, and TRANSUNION; and/or an identity protection company, such as LIFELOCK, LEGALSHIELD, and IDENTITYFORCE. The third party verification service may verify the authenticity of the verification data entered by the user, such as a photograph of a driver's license. The third party verification service may additionally or alternatively verify the information against authoritative sources such as a credit bureau or government data. The third party verification service may additionally or alternatively verify the information against its own proprietary data. For example, the third party verification service may have a repository of biometric data for many people and compare biometric data in the verifiable data set (or supplied directly from the user) against that repository. In some instances, the third party verification service may have a pre-existing relationship with the subject taxpayer.

In Step 406, the third party verification service receives the request. As discussed above, the request may be in the form of an electronic message or the like. The request may then be placed into a queue depending on the current demand, or the request may be immediately sent for verification.

In Step 408, the third party verification service accesses at least one data store. The third party verification service may identify the specific data store or data stores which contain the relevant information necessary to the specific verifiable data set. For example, as illustrated in FIG. 4, the third party verification service may identify that the banking information set may include information related to the bank account to which the refund has been requested to be deposited and the employer of the subject taxpayer. The third party verification service may therefore select to access two data stores, a bank and account data store and an employer and employee data store.

In embodiments of the invention, the third party verification service retrieves information related to a financial institution related to the refund vehicle from the bank and account data store. Most refund vehicles (especially those allowed or preferred by taxing authorities) are associated with a financial institution in some way. For example, if the refund vehicle is a direct deposit, the financial institution is the bank that maintains the account. The third party verification service therefore retrieves information about the financial institution to detect fraud. If the financial institution is located in a foreign country, this may be evidence of fraud. Similarly, if the financial institution is a small regional bank in a region where the subject taxpayer does not live or work, this may be an indication of fraud. If, however, the financial institution is located or has a branch near the subject taxpayer, this may be an indication of genuineness. The type of financial institution may also be relevant. For example, a large bank is assumed to have more stringent authentication and oversight of accounts than a payday loan establishment. Other relevant information could be how long the financial institution has been in business, the demographic clientele of the financial institution (and whether the subject taxpayer is in that demographic), past instances of fraud associated with that financial institution, known past data breaches associated with the financial institution (such that account information may have been compromised), known authentication and verification procedures utilized by the financial institution with regards to customers, and other indicia of potentially fraudulent behavior.

In embodiments of the invention, the third party verification service may also retrieve information related to the account within the financial institution to which the refund vehicle will be designated. The relevant information may include the type of account (e.g., checking, savings, etc.), the name associated with the account (i.e., if it is the same as or substantially similar to the subject taxpayer), the length of time the account has existed, the current balance of the account, the average number of transactions per month, the manner in which the account was created (in person or over the Internet), the last time that the account owner was at the financial institution, unusual debits or credits in the account, any other deposits of tax refunds for current and previous tax years, the average amount of employer deposits (and whether they are consistent with the reported income levels), the name of employers direct depositing wages (and whether they are consistent with employers appearing on the subject tax return), the presence of debits and credits consistent with charitable donations and other tax-significant transactions (and whether they are consistent with tax deductions and credits claimed on the subject tax return), large transfers of funds between accounts (that may be consistent with money laundering), debits on the account that are likely associated with business or personal expenses (and whether these are consistent with claimed business expenses on the subject tax return), and other indicia of legitimate or verified user information.

It should be noted that in some instances, financial institutions would not (or legally cannot) share this information with the system. The third party verification service may therefore be able to perform these functions without violating the privacy concerns of the bank and the subject taxpayer. The third party verification service may be the bank itself, an organization associated with the bank, a regulatory agency overseeing the bank, etc.

In some embodiments, the user may enter electronic login information for the financial institution to gain authority to access at least a portion of the above-mentioned information. Additionally, the third party verification service may be utilized to ensure that even a genuine user has not under-reported income, over-reported expenses and charitable donations, etc. The system may therefore be utilized to determine fraudulent tax returns, meaning that the tax return and user are genuine but reporting false or misleading information to the taxing authority.

In embodiments of the invention, the third party verification service collects information related to the employer of the subject taxpayer. The system may then compare the type and specific institution involved with the type and amount of income provided. This can include the likelihood that the income source and income amount are genuine, because a common tax fraud strategy is to underreport income. Income types and amounts may be typical of some sources and not with others.

In embodiments of the invention, the information in the respective data stores includes an indication of the trustworthiness. Trustworthiness is an indication that the information within the data store is in fact associated with the taxpayer in the real world. For example, the data store may include bank account information for the subject taxpayer. If the bank account information is associated with a standard bank account that has been used steadily for many years, this is highly trustworthy information. It is likely that the bank account is in fact related to the subject taxpayer. Similarly, if the information in the data store includes an e-mail address for the subject taxpayer, but the e-mail address is a disposable e-mail address, this is not trustworthy information.

Most taxpayers do not use a disposable e-mail address, therefore it is fairly likely that the information does in fact relate to the subject taxpayer. If the verifiable data set includes the bank information discussed above, a match will have a very positive impact on the taxpayer identity confidence score. If the verifiable data set includes the e-mail address discussed above, a match will have a neutral or negative impact on the taxpayer identity confidence score.

The trustworthiness of the information therefore indicative of to what extent a match to the information is indicative of the user being genuine. Other examples of trustworthiness include credit card that paid for the tax return preparation program or other service (such as the duration of existence and the credit limit), user device information (such as duration of usage and geographic location of the device), employer information (such as how long the employer has existed and how long the user has been employed there), user account information (such as how long the user account has existed, whether the user has ever been verified in person), and other information.

In Step 410, the third party verification service determines whether the banking data matches the data in the respective data stores. This may be via a direct correlation, an indirect correlation that may be indicative of a typographical error, an indirect correlation that may be indicative of fraud, a failed correlation, etc. In Step 412, the third party verification service prepares a report indicative of the findings. The report may be in a format that is easy for the system to interpret. Based upon privacy or proprietary concerns, the report may refrain from including information directly from the data store.

In Step 414, the system receives, retrieves, or otherwise acquires the report from the third party verification service. The system may also remit payment for the services or otherwise provide account information for billing purposes to the third party verification service. Upon receiving the report, the system may interpret and analyzes the report for confidence indicators.

In Step 416, the report and/or the confidence indicators are sent to the indicator analysis engine for analysis, such as in the calculation and generation of an adjusted taxpayer identity confidence score. In other embodiments, the report received may be either "confirmed genuine," "confirmed fraudulent," or "inconclusive." In these embodiments, confirmed genuine reports are allowed to file, such as in Step 104 above. Confirmed fraudulent reports are held and quarantined, such as in Step 106 above. Inconclusive reports may be marked for manual review Determination of the Initial Taxpayer Identity Confidence Source In embodiments of the invention, the above-discussed steps of the refinement verification engine are performed after an initial taxpayer identity confidence score is determined. In other embodiments, the above-discussed steps of the refinement verification engine are performed concurrently with or in parallel with the calculation of the taxpayer identity confidence score. In either of these embodiments, it would be prudent to the reader to discuss an exemplary system for the determination of the taxpayer identity confidence score. The determination of the taxpayer identity confidence score is discussed in much more depth in commonly assigned U.S. patent application Ser. No. 14/692,062 and U.S. patent application Ser. No. 14/692,314, both filed Apr. 21, 2015, and both entitled "COMPUTER PROGRAM, METHOD, AND SYSTEM FOR DETECTING FRAUDULENTLY FILED TAX RETURNS." As noted above, both of these patent applications are incorporated by reference in their entirety.

Figure 5:
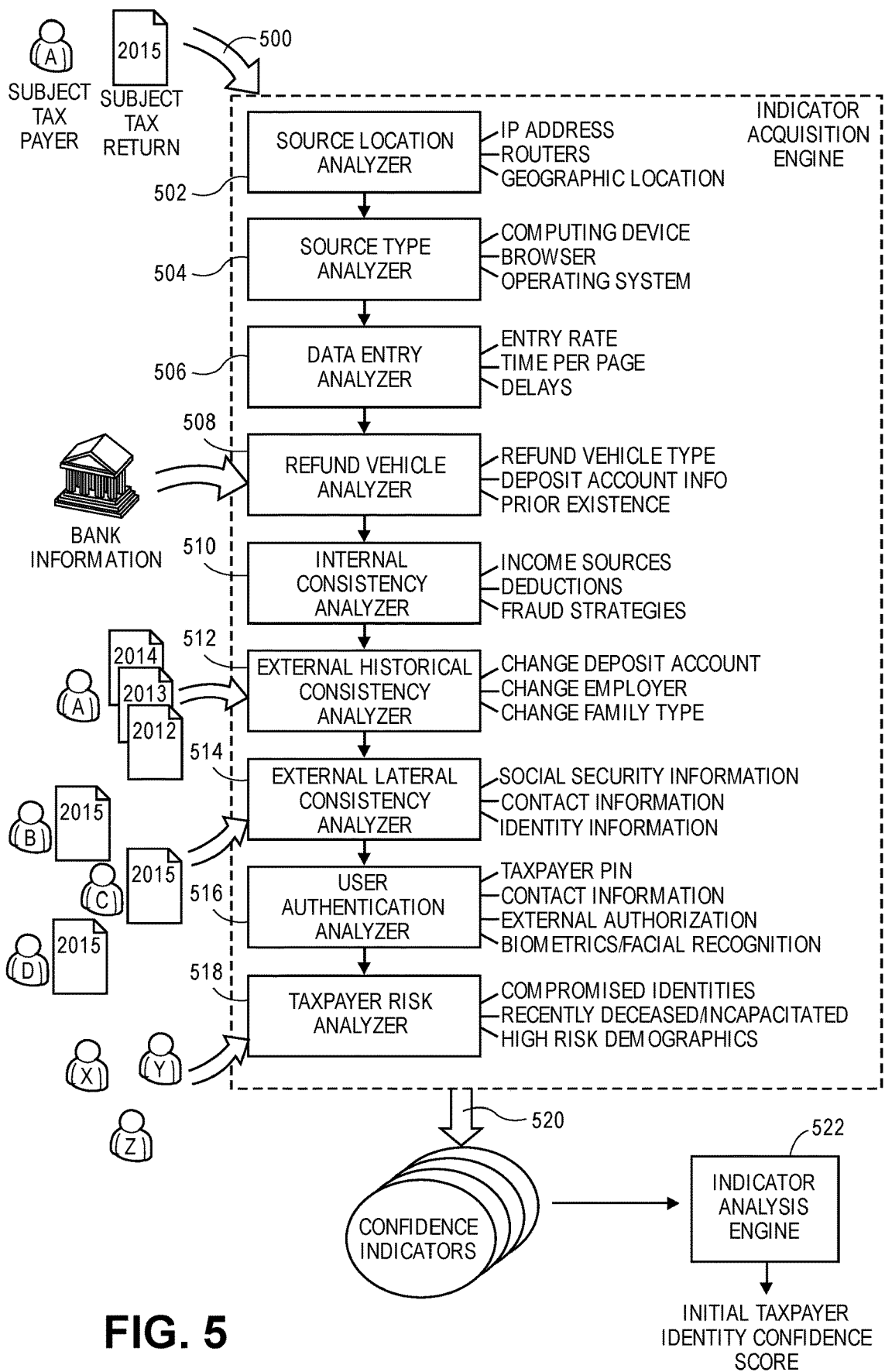
FIG. 5 is a flow diagram illustrating how an indicator acquisition engine and an indicator analysis engine calculate an initial taxpayer identity confidence score.

An exemplary method is illustrated in FIG. 5. Broadly, FIG. 5 shows the identification of confidence indicators and the analysis of those confidence indicators to determine an initial taxpayer identity confidence score. In Step 500, an indicator acquisition engine receives information about a subject taxpayer (labeled "A") and a subject tax return (labeled "2015" as an exemplary tax year to which the subject tax return relates). This information may further include information related to the user and a computing device utilized by the user. The indicator acquisition engine evaluates the information and draws on other external sources of information to determine a plurality of confidence indicators.

The indicator acquisition engine may comprise a plurality of sub-component indicator acquisition analyzers that determine confidence indicators based upon various criteria and sources. In Step 502, a source location analyzer determines confidence indicators related to the source location from which the user is accessing the system. For example, the source location analyzer may consider the Internet Protocol (IP) address, routers and servers through which the user accesses the system, the geographic location where the user is located, etc. In Step 504, a source type analyzer determines confidence indicators related to the computing device from which the user is working. For example, the source type analyzer may consider the type of computing device, a browser used to access the system, an operating system for the device, etc.

In Step 506, a data entry analyzer determines confidence indicators related to the entry of data into the system and/or a tax return preparation program by the user. For example, the data entry analyzer may consider the entry rate of information (i.e., consistent with human typing), the time spent per page or total in the tax return preparation process, whether there are delays in the preparation that would be consistent with a legitimate human preparing their tax return, etc. In Step 508, a refund vehicle analyzer determines confidence indicators related to the selected refund vehicle through which the subject taxpayer will receive their tax refund. For example, the refund vehicle analyzer may consider the type of refund vehicle chosen by the user, the deposit account information, the prior existence or ongoing nature of the refund vehicle, etc. The refund vehicle analyzer may pull in external information from the bank based upon the tax information input. In Step 510, an internal consistency analyzer determines confidence indicators related to characteristics of the tax information or subject tax return that may be consistent with fraud. The internal consistency analyzer looks for fraud on the face of the subject tax return without comparing the tax return to external sources of information. For example, the internal consistency analyzer may consider the income sources, deductions, and credits in comparison to common fraud strategies used by malfeasants.

In Step 512, an external historical consistency analyzer determines confidence indicators related to prior-filed tax returns of the subject taxpayer. The external historical consistency analyzer draws or receives previously filed tax returns (labeled "2012"-"2014" in relation to the exemplary subject tax return for 2015), or related sets of information, that relate to the same subject taxpayer (labeled "A"). For example, the external historical consistency analyzer may consider changes in deposit account information, unusual changes in employment information, and unusual changes in family type and composition. In Step 514, an external lateral consistency analyzer determines confidence indicators related to comparing the subject tax return to other tax returns filed for the current tax year that relate to other taxpayers. The external lateral consistency analyzer draws or receives previously filed tax returns (each labeled "2015," the same tax period as the subject tax return), or related sets of information, that relate to a plurality of taxpayers (labeled "B"-"D"). In embodiments, all of the plurality of taxpayers is different than the subject taxpayer. In alternative embodiments of the invention, at least a portion of the plurality of taxpayers is different than the subject taxpayer. For example, the external lateral consistency analyzer may consider duplicate social security numbers (SSNs), duplicate contact information, and other duplicate or suspicious identification information.

In Step 516, a user authentication analyzer determines confidence indicators related to the user's ability or inability to authenticate his identity as the subject taxpayer or a person authorized by the subject taxpayer to file the subject tax return. For example, the user authentication analyzer may consider the user's ability to provide an assigned taxpayer personal identification number (typically supplied by the taxing authority), to respond to messages to various known contact information for the subject taxpayer, to provide external authorization, and to submit secondary authorization information such as biometrics and facial recognition data. In Step 518, a taxpayer risk analyzer determines confidence indicators related to likelihood that the subject taxpayer will be or is the victim of identity theft. The taxpayer risk analyzer draws on external information sources, such as elicit marketplaces of stolen identities. For example, the taxpayer risk analyzer may consider compromised identities of taxpayers, recently deceased or incapacitated taxpayers, and whether the subject taxpayer belongs to a high risk demographic.

Based upon all (or some) of the above analyses, in Step 520 the indicator acquisition engine accumulates all of the confidence indicators and submits them to the indicator analysis engine. In Step 522, the indicator analysis engine considers the plurality of confidence indicators and calculates the initial taxpayer identity confidence score. The indicator analysis engine weighs confidence indicators, compares them together or in discrete groups, and otherwise performs various statistical analyses. The indicator analysis engine analyzes the consistency of the confidence indicators together, as to whether they indicate genuineness or fraud. Based upon the initial taxpayer identity confidence score, the system may take further actions, such as submit the tax return to the taxing authority with information indicative of the taxpayer identity confidence score, deny filing, report the user and/or the subject tax return to an appropriate law enforcement agency, send the subject tax return to the refinement verification engine (as discussed above), etc.

Additional Embodiments

While the disclosure has heretofore referred to taxing authorities, tax returns, and taxpayers. It should be appreciated that in other embodiments, the invention is directed to government entities other than taxing authorities, such as an administrative agency, or to companies or other organizations. The administrative agency may be associated with a government entitlement program, such as the Social Security Administration or Medicaid. The administrative agency may additionally, or in the alternative, be associated with a regulatory program, such as the Environmental Protection Agency or the Securities and Exchange Commission. The company or organization may be associated with or performing the functions of, a government entity, or it may be a for-profit or not-for-profit entity unrelated to the government. For example, the government entity or company may receive and process claim forms and the like that would be subject to fraud.

In these embodiments, the "taxpayer" may instead be a "beneficiary," a "citizen," a "customer," a "third party," etc. While most of the present disclosure is directed to the field of taxes, this is only an exemplary field of use. For example, if the "taxing authority" is the Social Security Administration, then the "taxpayer" would be referred to as a "beneficiary." This disclosure is therefore not intended to be limiting, but instead provide an easy-to-understand exemplary embodiment of the invention.

System Hardware

Turning to FIG. 6, the physical hardware that makes up the system will now be discussed. The system 600 comprising an exemplary hardware platform that can form one element of certain embodiments of the invention is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608.

Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Local network 626 is in turn connected to Internet 632, which connects many networks such as local network 626, remote network 634 or directly attached computers such as computer 636. In some embodiments, computer 602 can itself be directly connected to Internet 632.

Computer Program

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, smart watches, wearable technology, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

Embodiments of the invention directed to the computer program may perform any or all of the above-discussed steps. The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-alone computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the taxpayer may be provided with a taxpayer account that permits the taxpayer to access embodiments of the invention that are applicable to submitting and authenticating their tax return. Additionally, the tax professional or financial professional may be provided with a tax/financial professional account that permits the tax professional or financial professional to access embodiments of the invention that are applicable to accessing the filed return data store, verifying their customer, etc. Additionally, the third party verification service may be provided with a verification account to access embodiments of the invention that are applicable to receiving, analyzing, and reporting on the verifiable data sets. In addition, any number and/or any specific types of account are provided to carry out the functions, features, and/or implementations of the invention. Upon the taxpayer, tax professional, and/or third party verification service logging in to the electronic resource for a first time, they may be required to provide various pieces of identification information to create their respective accounts. Such identification information may include, for instance, personal name, business name, email address, phone number, or the like. Upon providing the identification information, the taxpayer, tax professional, and/or third party verification service may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention,

What is claimed as new and desired to be protected by Letters Patent includes the following:

1. A system comprising at least one processor and at least one non-transitory computer readable storage medium having a computer program stored thereon for authenticating a user who is submitting a subject tax return, the system method comprising:
   an indicator acquisition engine for determining a plurality of confidence indicators regarding the user and the subject tax return,
   wherein each confidence indicator is indicative that the user is either genuine or fraudulent;
   an indicator analysis engine for analyzing said plurality of confidence indicators so as to determine an initial taxpayer identity confidence score;
   a refinement verification engine for identifying at least one verifiable data set of taxpayer information, wherein the at least one verifiable data set comprises information associated with the user;
   wherein if the initial taxpayer identity confidence score falls into a high range indicative that the user is genuine, filing the subject tax return,
   wherein if the initial taxpayer identity confidence score falls into a low range indicative that the user is fraudulent, preventing the subject tax return from being filed,
   wherein if the initial taxpayer identify confidence score falls in an intermediate range indicative that the authenticity of the user is uncertain, providing a further verification of the user and the subject tax return by the refinement verification engine, wherein said intermediate range is between the high range and the low range,
   wherein the high range, the low range, and the intermediate range are color-coded on a graphical user-interface for the user;
   wherein said refinement verification engine is configured to perform the following steps:
      accessing at least one external data store containing information related to the at least one verifiable data set; and
      determining whether information indicative of the at least one verifiable data set is present in the at least one external data store to authenticate the user; and
      filing the subject tax return upon said determination that the information indicative of the at least one verifiable data set is present in the at least one external data store.

2. The system of claim 1, wherein the step of accessing the at least one external data store is performed by sending the at least one verifiable data set to an external verification service.

3. The system of claim 1, wherein the step of accessing the at least one external data store is performed by retrieving information from the at least one external data store remotely.

4. The system of claim 1,
   wherein the at least one verifiable data set comprises a first verifiable data set, and a second verifiable data set,
   wherein said refinement verification engine is further configured to perform the following step:
   identifying the second verifiable data set.

5. The system of claim 4,
   wherein the at least one external data store comprises a first external data store and a second external data store,
   wherein said refinement verification engine is further configured to perform the following step:
   verifying the second verifiable data set by accessing the second external data store.

6. The system of claim 1, wherein said refinement verification engine is further configured to perform the following step:
   identifying a verification confidence indicator,
   wherein the verification confidence indicator is associated with said step of determining whether information indicative of the at least one verifiable data set is present in the at least one external data store.

7. The system of claim 6, further comprising:
   sending the verification confidence indicator to be analyzed by the refinement verification engine.

8. The system of claim 7, wherein the indicator analysis engine is configured to calculate an adjusted taxpayer identity confidence score based upon the initial taxpayer identity confidence score and the verification confidence indicator.

9. A computerized method for verifying the authenticity of a user submitting a subject tax return comprising the following steps:
   receiving, by a processing element, taxpayer information associated with the subject tax return;
   analyzing, by the processing element, the tax information to determine an initial taxpayer identity confidence score;
   wherein if the initial taxpayer identity confidence score falls into a high range indicative that the user is genuine, filing the subject tax return,
   wherein if the initial taxpayer identity confidence score falls into a low range indicative that the user is fraudulent, preventing the subject tax return from being filed,
   wherein if the initial taxpayer identify confidence score falls in an intermediate range that is between the high range and the low range, which is indicative that the authenticity of the user is uncertain, providing a further verification of the user and the subject tax return,
   wherein the high range, the low range, and the intermediate range are color-coded on a graphical user-interface for the user,
   said further verification comprising:
      identifying, by the processing element, at least one verifiable data set within the taxpayer information, wherein the at least one verifiable data set comprises information associated with the user;
      accessing, by the processing element, at least one external data store containing information related to the at least one verifiable data set;
      determining, by the processing element, whether information indicative of the at least one verifiable data set is present in the at least one external data store; and
      filing the subject tax return upon said determination that the information indicative of the at least one verifiable data set is present in the at least one external data store.

10. The computerized method of claim 9, wherein the step of accessing the at least one external data store is performed by sending the at least one verifiable data set to an external verification service.

11. The computerized method of claim 9, wherein the step of accessing the at least one external data store is performed by retrieving information from the at least one external data store remotely.

12. The computerized method of claim 9,
   wherein the at least one verifiable data set comprises a first verifiable data set and a second verifiable data set, the method further comprising the step of identifying the second verifiable data set.

13. The computerized method of claim 12, wherein the at least one external data store comprises a first external data store and a second external data store, the method further comprising the step of verifying the second verifiable data set by accessing the second external data store.

14. The computerized method of claim 9, further comprising the following step:
identifying, by the processing element, a verification confidence indicator,
wherein the verification confidence indicator is associated with said step of determining whether information indicative of the at least one verifiable data set is present in the at least one external data store.

15. The computerized method of claim 14, further comprising following step:
sending the verification confidence indicator for analysis by the processing element such that an adjusted taxpayer identity confidence score is determined based upon the initial taxpayer identity confidence score and the verification confidence indicator.

16. A computerized method for authenticating that a user is genuine in order to file a subject tax return, comprising the following steps:
receiving a request for verification of at least one verifiable data set,
wherein said request for verification is an electronic message sent to a third party verification service from a tax preparation system,
wherein the at least one verifiable data set is derived at least in part from a set of taxpayer information related to the user and the subject tax return,
wherein the at least one verifiable data set includes information capable of independent verification,
wherein the at least one verifiable data set comprises information associated with the user;
analyzing the at least one verifiable data set to determine a first data store that comprises information potentially associated with the at least one verifiable data set;
accessing said first data store to determine a set of findings based upon whether the at least one verifiable data set substantially matches information within said first data store;
preparing a report indicative of the set of findings;
sending the report indicating that the user is genuine to an indicator analysis engine such that the subject tax return can be filed; and
upon verification that the user is genuine, filing the subject tax return with a computing device.

17. The computerized method of claim 16, wherein the report refrains from disclosing information from the at least one data store,
wherein the report includes an indication of trustworthiness of the information.

18. The computerized method of claim 16, wherein the at least one verifiable data set comprises a first verifiable data set and a second verifiable data set,
wherein said step of analyzing the at least one verifiable data set includes analyzing the second verifiable data set to determine a second data store that comprises information potentially associated with the second verifiable data set;
further comprising accessing said second data store to determine a set of findings based upon whether the second verifiable data set substantially matches information within said second data store.

\* \* \* \* \*